US006731727B2

(12) United States Patent
Corbett et al.

(10) Patent No.: US 6,731,727 B2
(45) Date of Patent: *May 4, 2004

(54) METHODS FOR DISPLAYING CALLER IDENTIFICATION INFORMATION ON AN INTEGRATED DISPLAY/TELEPHONE SYSTEM CAPABLE OF DISPLAYING IMAGES

(75) Inventors: Joseph C. Corbett, 245 N. Main St., Millville, UT (US) 84326; William I. Fletcher, 560 N. 100 West, Mendon, UT (US) 84325; Alan R. Loudermilk, 1550 N. Lake Shore Dr., Suite 16C, Chicago, IL (US) 60610

(73) Assignees: Joseph C. Corbett, Milville, UT (US); William I. Fletcher, Mendon, UT (US); Alan R. Loudermilk, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/378,190

(22) Filed: Mar. 3, 2003

(65) Prior Publication Data

US 2003/0138083 A1 Jul. 24, 2003

Related U.S. Application Data

(63) Continuation of application No. 10/161,909, filed on Jun. 3, 2002, now Pat. No. 6,546,092, which is a continuation of application No. 09/872,439, filed on Jun. 1, 2001, now Pat. No. 6,427,003, which is a continuation of application No. 09/565,331, filed on May 5, 2000, now Pat. No. 6,243,448, which is a continuation of application No. 08/696,554, filed on Aug. 14, 1996, now Pat. No. 6,061,434.

(51) Int. Cl.[7] ............................................. H04M 11/00
(52) U.S. Cl. .................. 379/93.35; 379/93.23; 379/142.04; 379/142.17

(58) Field of Search ........................... 379/90.01, 93.01, 379/93.05–93.07, 93.17, 93.18, 93.23, 93.35, 110.01, 142.01, 142.04, 142.17, 142.06

(56) References Cited

U.S. PATENT DOCUMENTS

| 4,338,492 A | 7/1982 | Snopko | 379/110.01 |
| 4,356,509 A | 10/1982 | Skerlos et al. | 379/110.01 |

(List continued on next page.)

FOREIGN PATENT DOCUMENTS

| JP | 2223911 | 4/1990 | 379/53 |
| JP | 2202278 | 8/1990 | 379/142 |
| WO | WO93/01685 | 1/1993 | 379/96 |

*Primary Examiner*—Wing Fu Chan
(74) *Attorney, Agent, or Firm*—Loudermilk & Associates

(57) ABSTRACT

Methods for displaying caller identification information on an integrated display/telephone system capable of displaying images are disclosed. One or more signals are received and one or more images are displayed on a display of the integrated display/telephone system. An incoming telephone call is received with the integrated display/telephone system, and data corresponding to the incoming telephone call is received with the incoming telephone call. A caller identification display signal in generated, and the caller identification display signal is based on the one or more received signals and the data received with the incoming telephone call. The caller identification display signal includes the one more received signals and signals from a generator that generates character signals and background display signals. The character signals are generated responsive to the data received with the incoming call, and in response to an incoming telephone call, caller identification is displayed on the display along with the displayed one or more images.

20 Claims, 6 Drawing Sheets

U.S. PATENT DOCUMENTS

| | | | |
|---|---|---|---|
| 4,456,925 A | 6/1984 | Skerlos et al. | 379/110.01 |
| 5,128,987 A | 7/1992 | McDonough et al. | 379/102.03 |
| 5,146,490 A | 9/1992 | Beckman | 379/142 |
| 5,327,486 A | 7/1994 | Wolff et al. | 379/93.23 |
| 5,343,516 A | 8/1994 | Callele et al. | 379/98 |
| 5,347,574 A | 9/1994 | Morganstein | 379/142 |
| 5,349,638 A | 9/1994 | Pitroda et al. | 379/98 |
| 5,546,448 A | 8/1996 | Caswell et al. | 379/96 |
| 6,061,434 A | 5/2000 | Corbett | 379/93.35 |
| 6,243,448 B1 | 6/2001 | Corbett | 379/93.35 |
| 6,427,003 B1 * | 7/2002 | Corbett et al. | 379/93.35 |
| 6,546,092 B2 * | 4/2003 | Corbett et al. | 379/93.35 |

* cited by examiner

METHODS FOR DISPLAYING CALLER IDENTIFICATION INFORMATION ON AN INTEGRATED DISPLAY/TELEPHONE SYSTEM CAPABLE OF DISPLAYING IMAGES

This is a continuation of application Ser. No. 10/161,909, filed Jun. 3, 2002, now U.S. Pat. No. 6,546,092 which is a continuation of application Ser. No. 09/872,439, filed Jun. 1, 2001, now U.S. Pat. No. 6,427,003 which is a continuation of application Ser. No. 09/565,331, filed May 5, 2000, now U.S. Pat. No. 6,243,448, which is a continuation of application Ser. No. 08/696,554, filed Aug. 14, 1996, now U.S. Pat. No. 6,061,434.

FIELD OF THE INVENTION

The present invention relates to caller identification and telephone/video systems and methods, and more particularly to caller identification and telephone/video systems and methods in which caller identification information for an incoming call is displayed on a television screen and in which a user may select or answer, forward or otherwise process the incoming call.

BACKGROUND OF THE INVENTION

Caller identification for incoming telephone calls is known in the art. As part of many advanced telephone systems, an identification by telephone number and/or name of the calling party may be displayed at a receiving telephone station, which may include the date and time of call, etc. A person at the receiving telephone station may view such caller identification information and, for example, decide whether to answer the incoming call.

Various telephones and ancillary devices have been developed to process such caller identification information. Principally, such devices display the incoming caller's telephone number and/or name, etc., such as with a stand-alone display or with a display integrated into the telephone. With such a device, a person watching television must be near (or move to be near) the display in order to view such displayed information, and such a person must be near (or move to be near) the telephone in order to answer or otherwise process such an incoming call.

Such devices in such circumstances are limited in their utility and provide an undesirable level of inconvenience for many users.

SUMMARY OF THE INVENTION

The present invention provides circuits and methods for determining the caller identification for an incoming call and for displaying such caller identification information on a video display device such as a television. In a preferred embodiment, the present invention includes a caller identification line modem for determining the caller identification information, a control processor for translating and/or inputting such caller identification information to a video circuit for displaying the caller identification information. The present invention also provides various methods for so displaying caller identification information, including overlaying such information on an input video signal, generating a separate caller identification video signal, which may be placed, for example, on an unused television channel, etc.

Additionally, the caller identification circuits and methods of the present invention also may be integrated or combined with various advanced television, video arid/or telephony functions. For example, in certain embodiments an advanced remote control unit is provided so that the user may determine from the video/television screen the identity of the caller, and then forward the call to a voice messaging system, forward the call to another line, answer the call on a video phone, answer the call on a separate telephone, etc. Still additionally, in other embodiments of the present invention the caller identification circuit is provided with programmable intelligence so that incoming calls may not only be displayed on the video/television screen, but also may be desirably processed depending on the identity of the particular caller.

Accordingly, it is an object of the present invention to provide video caller identification systems and methods for displaying caller identification information on a video screen such as a television.

It is another object of the present invention to provide advanced video caller identification systems and methods that enable the user to desirably process an incoming call depending upon the identity of the incoming caller, which may include answering the call with a video phone or a separate telephone, forwarding the call to another line or to a voice messaging system, etc.

It is yet another object of the present invention to provide advanced video caller identification systems and methods that enable the user via remote control to desirably process an incoming call or to otherwise desirably process input video sources or the like.

BRIEF DESCRIPTION OF THE DRAWINGS

The present invention will be described by way of various preferred embodiments and the accompanying figures, in which.

DETAILED DESCRIPTION OF THE PREFERRED EMBODIMENTS

The present invention will now be described by way of various preferred embodiments. It should be noted that, with the present invention, caller identification information for an incoming call may be determined and processed in a manner suitable for display on a video screen such as a television. The present invention, as more fully described herein, provides systems and methods in which such caller identification information may be displayed and/or processed in a desirable manner in connection with such a television or more advanced video and/or telephony systems.

Figure 1:
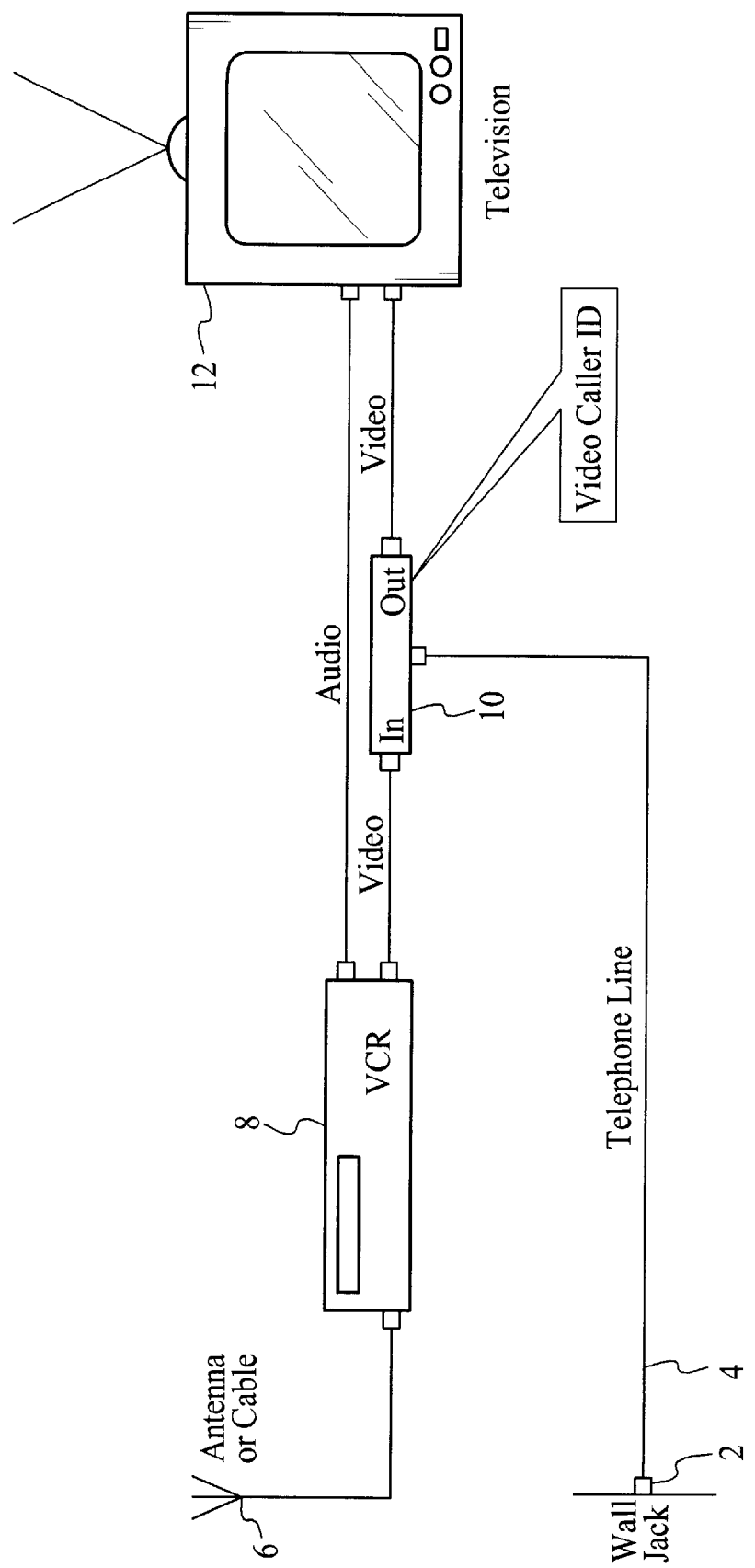
FIG. 1 is a block diagram illustrating a first embodiment system configuration of the present invention.

FIG. 1 is a block diagram illustrating a first embodiment system configuration of the present invention. An incoming call is received, typically, at jack 2 in a home or office, etc. In the preferred embodiment, jack 2 is what is known as an RJ-11 jack or other standard jack. What is important is that a suitable means for connecting and receiving telephone signals from an external telephone network be provided. An incoming telephone call is coupled to video caller ID circuit 10 via telephone line 4.

As more fully described elsewhere herein, video caller ID circuit 10 determines caller identification information for incoming calls, and outputs signals in a manner such that caller identification information may be displayed on a video screen such as television 12. Video caller ID circuit 10 may, depending on the application and desire of the user/system developer, display the name, nickname, telephone number, date, time and/or other information regarding an incoming call on the video screen. Such caller identification information may be displayed as an overlay over an incoming video signal, or alternatively may be displayed on a separate video signal generated by video caller ID circuit 10. Additionally, video caller ID circuit 10 may momentarily display such caller identification information (e.g., for 5 or 10 seconds) and then automatically remove such information. Alternatively, such caller identification information may be continuously displayed (such as on an unused video channel), or, in particular embodiments, until removed by subsequent incoming calls, user command, etc.

In the embodiment of FIG. 1, an external video signal (such as from an antenna or input cable) is received at input 6, which is then coupled to a video device such as VCR 8. It should be noted that, while VCR 8 is illustrated in this and other figures, other suitable video playback or other devices could be similarly utilized herein. For example, satellite receivers, video disk players, cable system decoders or set-top boxes or other video signal generation or playback devices could be utilized in lieu of VCR 8. What is important with respect to this embodiment is that video caller ID circuit 10 is positioned as illustrated between an input video device (e.g., VCR 8) and the display device (e.g., television 12).

With the embodiment of FIG. 1, VCR 8 outputs video and audio information over video and audio input lines (which may be stereo or mono, etc.), which are coupled to inputs of television 12. Video caller ID circuit 10 is positioned in the video path as illustrated, such that the video output signal from VCR 8 is coupled through video caller ID circuit 10. VCR 8 may be playing a video tape or using an internal tuner or the like to provide an input video signal to television 12 (again, VCR 8 may be any of a number of video devices). In this embodiment, television 12 is displaying the video signal from VCR 8. In the event of an incoming telephone call, video caller ID circuit 10 detects such incoming call and determines caller identification information for such incoming call. Video caller ID circuit 10 then displays such caller identification information (after any necessary processing) in an overlay manner on the input signal currently being viewed on television 12. Such caller identification information may be displayed in a bar such as at the top or bottom of the television screen or in an appropriate box, etc. In this embodiment, the caller identification information is temporarily displayed in such overlay manner for a predetermined interval of time (which may be set by the system developer or alternatively may be selected by the user, etc.) and then automatically removed. With such displayed caller identification information, the television viewer may decide whether to manually answer the incoming call based on the displayed caller identification information.

Figure 2:
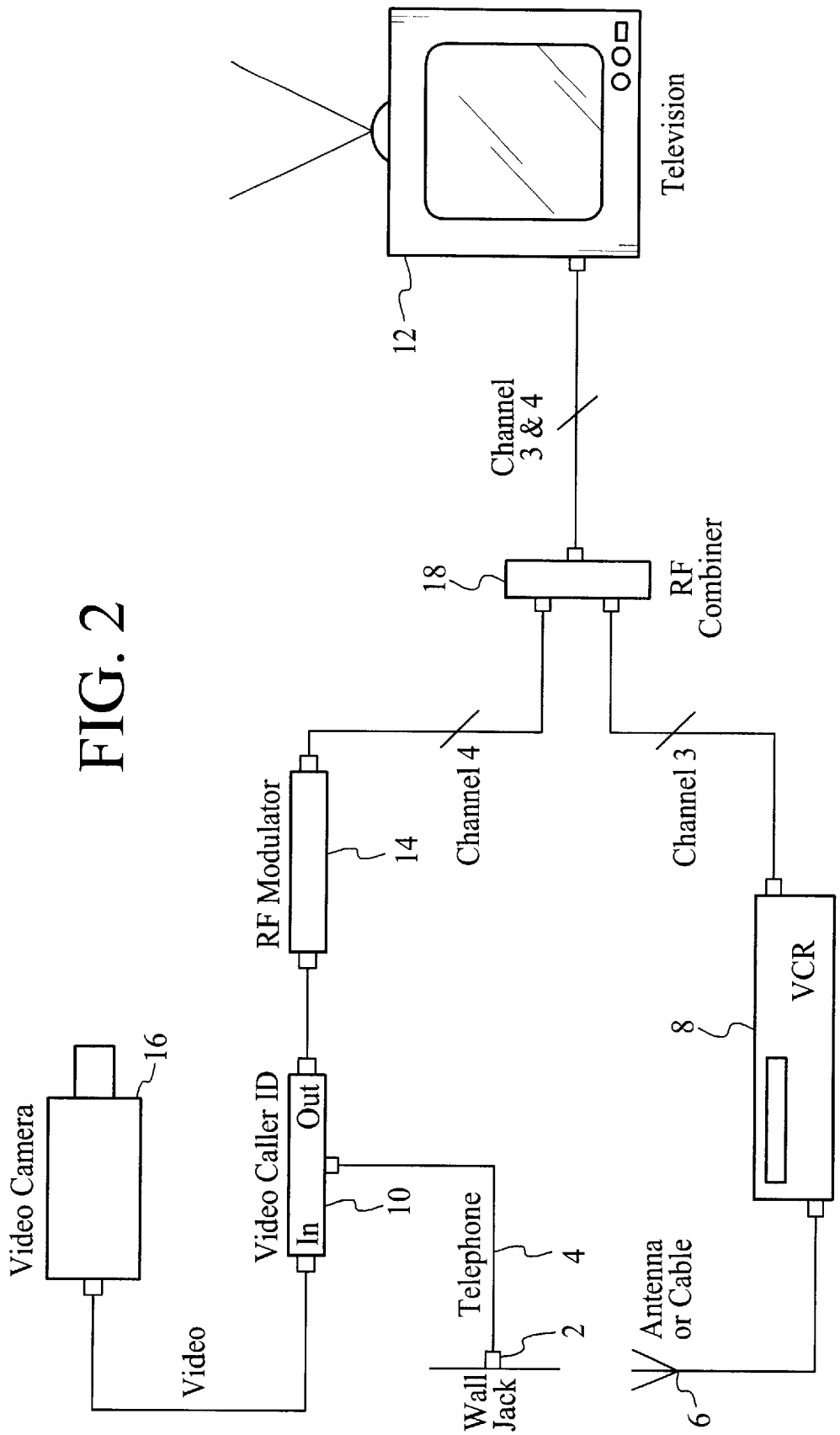
FIG. 2 is a block diagram illustrating a second embodiment system configuration of the present invention.

FIG. 2 is a block diagram illustrating a second embodiment system configuration of the present invention. With this embodiment, input 6 is coupled to VCR 8, which outputs a video signal on a particular channel of television 12, such as channel 3. In such an embodiment, a video source couples a desired video signal through a particular channel of the television, which is commonly utilized with VCRs, cable boxes, etc. Video caller ID circuit 10 again receives telephone signals through jack 2 and telephone line 4. Additionally, with this embodiment video caller ID circuit 10 also may receive an input video signal, such as from an external camera or other video source. The output of video caller ID circuit 10 is input to RF modulator 14, which serves to modulate the video signal output by video caller ID circuit 10 to a television channel that is not otherwise being utilized by television 12 (e.g., channel 4). The output of RF modulator 14 and the output of VCR 8 are coupled to RF combiner 18, the output of which is input to television 12. Video caller ID circuit 10 in such embodiments generates a video signal displaying desired caller identification information, which may be a separate video signal generated by video caller ID circuit 10 or an overlay over an input video signal provided by video camera 16 (or other video source coupled to the video input of video caller ID circuit 10).

With the embodiment of FIG. 2, an incoming call may be heard by the television viewer. Upon hearing the call, such as by a telephone ringing, the viewer may change the television from the channel displaying the output of VCR 8 (e.g., channel 3) to the channel displaying the output of video caller ID circuit 10 (e.g., channel 4). Such a channel change is desirably performed by a remote controller for television 12. Upon changing the channel, caller identification information may be desirably displayed on television 12, and the television viewer may decide whether to manually answer the incoming call based on the displayed caller identification information, etc. Additionally, video caller ID circuit 10 may desirably receive an input such as from camera 16, which may be, for example, a security camera positioned at a door or other desirable location, baby monitor camera, etc. Thus, with such an embodiment, whether or not an incoming call is being received, video caller ID circuit 10 may be selected to display on television 12 the signal generated by camera 16.

Figure 3:
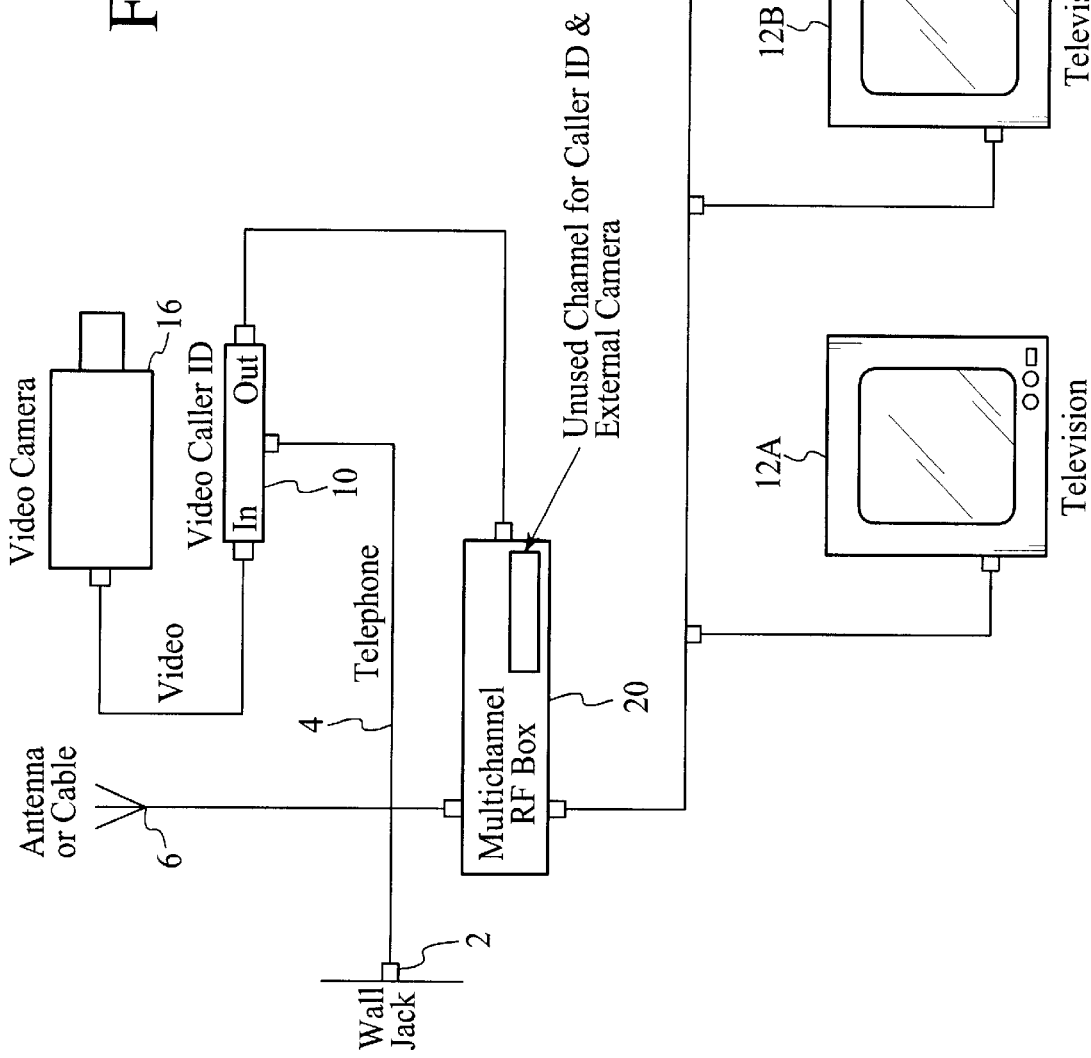
FIG. 3 is a block diagram illustrating a third embodiment system configuration of the present invention.

FIG. 3 is a block diagram illustrating a third embodiment system configuration of the present invention. With this embodiment, multi-channel RF box 20 may provide television channels to multiple televisions 12A, 12B, 12C, etc. Multi-channel RF box 20 may receive television channel inputs from input 6, and also may receive as an input an output from video caller ID circuit 10, which, as with the embodiment of FIG. 2, may receive telephone signals from jack 2 via telephone 4 and video signals from another video source such as video camera 16. Multi-channel RF box 20 distributes television channels in a desired manner to televisions 12A, 12B, 12C, etc., which may include an otherwise unused channel which may serve as the caller identification/external camera channel. Multi-channel RF modulator 20 modulates such caller identification information and/or external camera video signals to such an otherwise unused channel. Upon hearing an incoming call, any viewer may view displayed caller identification information by changing the channel of the particular television to the channel displaying the caller identification information. As with the embodiment of FIG. 2, whether or not an incoming call is being received, the output of video caller ID circuit 10 may be selected to display on televisions 12A, 12B, 12C, etc, the signal generated by camera 16.

In alternative embodiments, multi-channel RF box 20 distributes separate video signals to the various televisions and contains circuitry to insert the caller identification information into the video signals of one or more of the distributed video signals such as in an overlay manner. With such alternative embodiments, caller identification information may be automatically displayed on one or more of the televisions for a predetermined interval of time, thereby alerting the television viewers to the presence of the call as well as the caller identification information.

Figure 4:
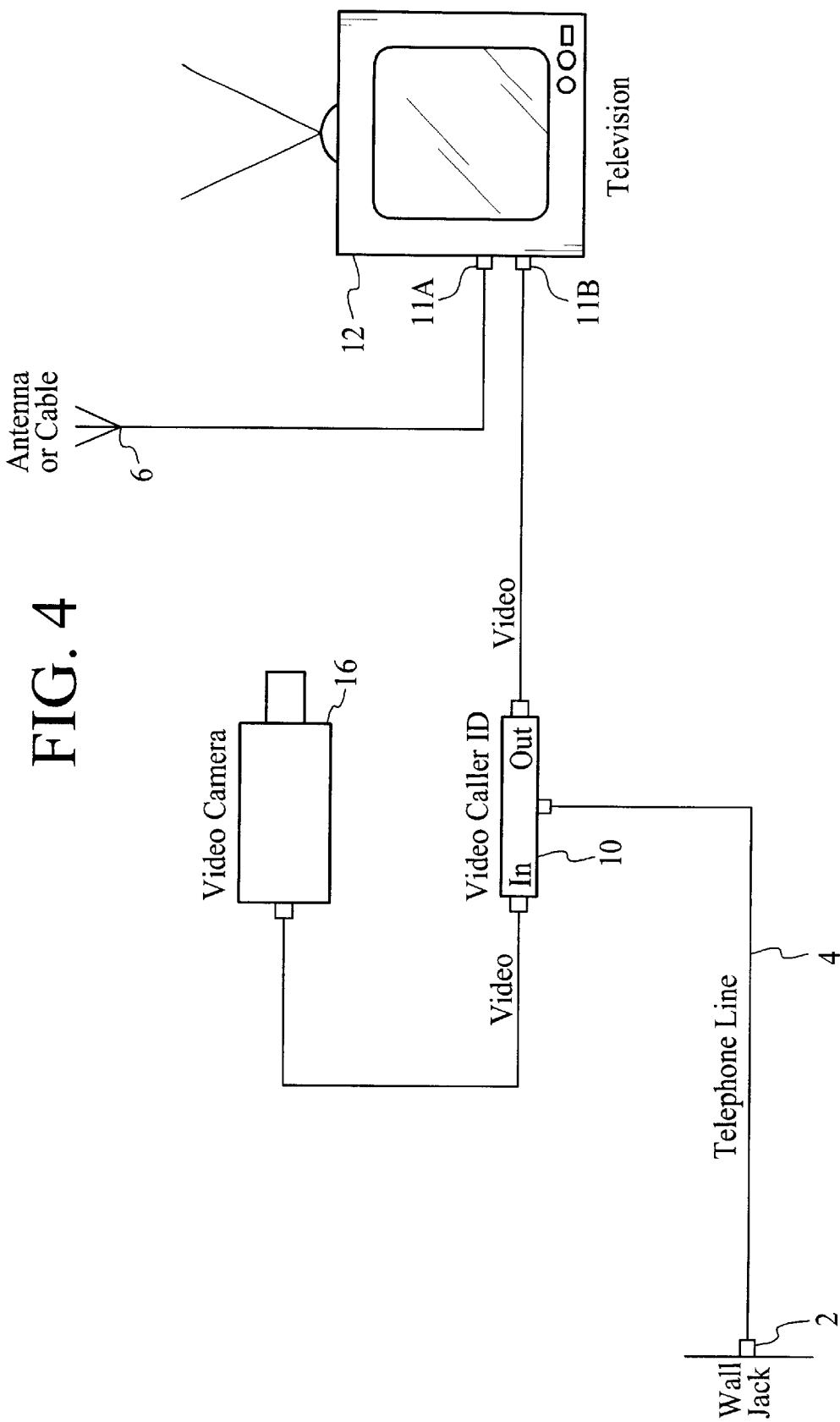
FIG. 4 is a block diagram illustrating a fourth embodiment system configuration of the present invention.

FIG. 4 is a block diagram illustrating a fourth embodiment system configuration of the present invention. With this embodiment, television 12 is equipped with multiple video inputs and/or antenna inputs, etc., 11A and 11B. Input 11A may be from video input 6, which in this embodiment may be from an antenna, cable or other video source such as VCR 8 described earlier. Input 11B receives the output of video caller ID circuit 10, which, as with the embodiments of FIGS. 2 and 3, may receive telephone signals from jack 2 via telephone 4 and video signals from another video source such as video camera 16. Television 12 may be controlled to display inputs received at its various inputs, such as inputs 11A and 11B. Upon hearing an incoming call, a television viewer may view displayed caller identification information by changing the video input of television 12 to video input 11B, which displays the caller identification information. As with the embodiments of FIGS. 2 and 3, whether or not an incoming call is being received, the output of video caller ID circuit 10 may be selected to display on television 12 the signal generated by camera 16.

In one particular aspect of such embodiments, television 12 is equipped with "picture-in-picture" capability. A channel or video signal being viewed may serve as the main picture signal, while the input from video caller ID circuit 10 may serve as the sub-picture signal. With such embodiments, a viewer may quickly and conveniently display such caller identification information in the sub-picture window. Still alternatively, in integrated embodiments such as described elsewhere herein, video caller ID circuit 10 and the picture-in-picture functionality may be integrated into the same device (e.g., television or VCR, etc.), with the caller identification information automatically displayed in a sub-picture window upon receipt of an incoming call.

Figure 5:
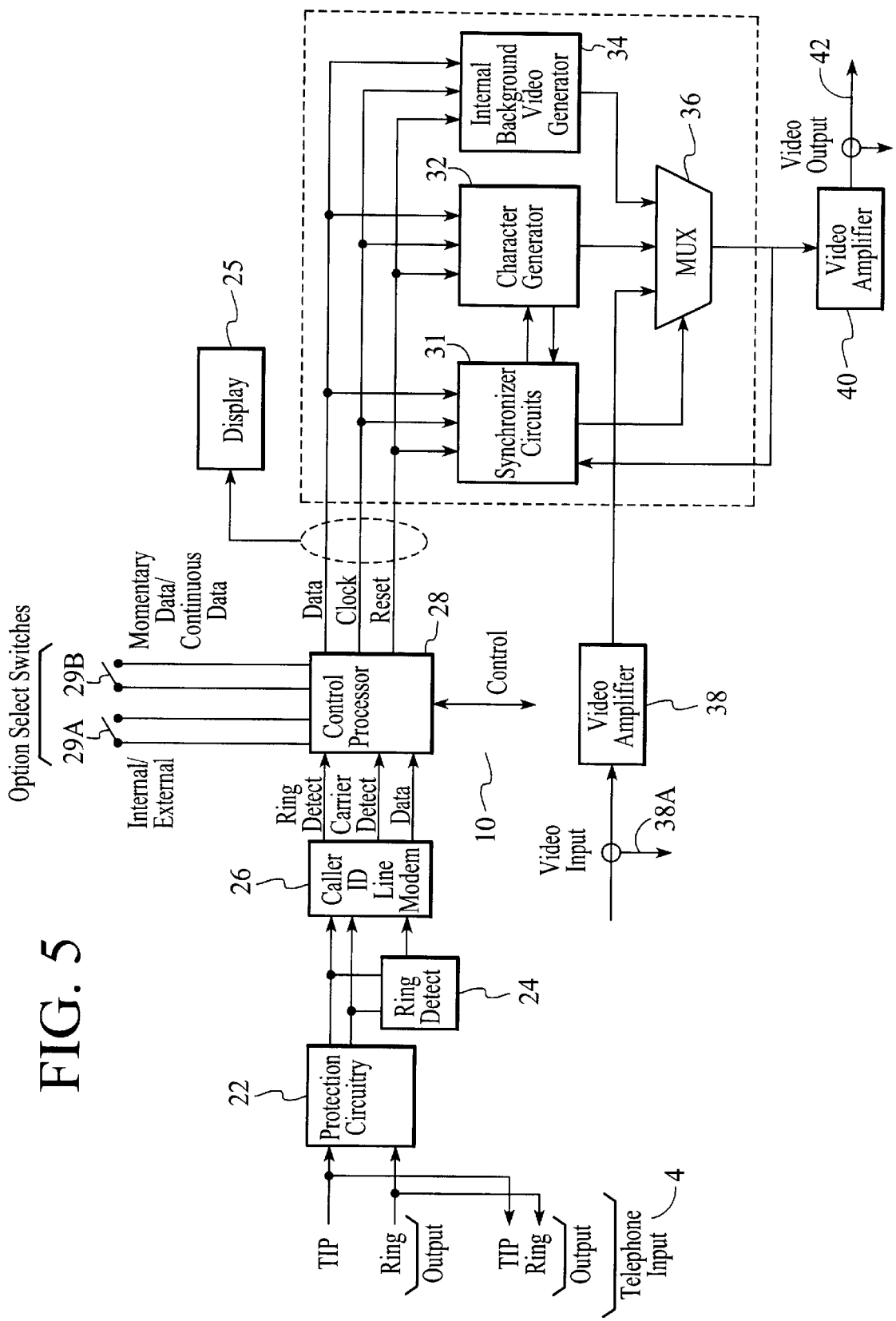
FIG. 5 is a diagram illustrating a preferred embodiment of a video caller identification system in accordance with the present invention.

FIG. 5 is a diagram illustrating a preferred embodiment of a video caller identification system in accordance with the present invention, and in particular a preferred embodiment of video caller ID circuit 10. Telephone line 4 provides a plurality of telephone inputs (two sets illustrated in FIG. 5, such as a multiple line telephone service), which typically consist of "tip and ring" telephone signals, and in alternative embodiments may consist of other standard telephone signals such as what is known as ISDN. The telephone inputs are coupled to protection circuit 22, which serves to protect the telephone lines from excessive current draw or other undesirable operation of video caller ID circuit 10. The signals output from protection circuit 22 are coupled to ring detector 24 and caller ID line modem 26. Ring detector 24 detects the occurrence of an incoming call and provides a signal to caller ID line modem 26. Caller ID line modem 26 decodes caller ID tones that typically occur between the first and second ring of the incoming call, and thereby extracts caller identification information for the incoming call For information relating to the signal protocol, etc., for such caller identification information, reference is made to Bellcore document numbers TR NWT-001188, GR-30-CORE, a module of FR NWT-000064, and Bellcore Digest No. BR-SR-104-SUB-12 ISS00 TRM 12, which are hereby incorporated by reference.

Caller ID line modem 26 in the preferred embodiments provides ring detect, carrier detect and data signals to control processor 28. In the preferred embodiments, the data are provided by way of a serial data stream to control processor 28, which contains the caller identification information. Control processor 28 recognizes the ring detect and carrier detect signals and decodes the incoming data stream to extract the caller identification information, which is stored in memory contained in control processor 28. Control processor 28 also receives in certain embodiments inputs from switches 29A and 29B, which way provide hard switches or software control switches by which, for example, the system, system developer or user may select internal video signal generation by video caller ID circuit 10 or an external video signal such as through input 38A (see, e.g., camera 16 of FIG. 2, etc.), or by which the system or user may select continuous or momentary display of the caller identification information, etc.

To the extent required, control processor 28 translates and/or converts the stored caller identification data to be a format desirable for video generator 31. Control processor 28 outputs data, clock and reset signals, which may be coupled to inputs of video generator 31. In certain embodiments, control processor 28 also outputs and/or receives other control signals, such as in embodiments where video caller ID circuit 10 is integrated or more tightly coupled with systems components such as a television, VCR, cable box, set-top box, satellite receiver, etc. As particular examples of integrated embodiments, caller ID circuit 10 is integrated with a television or VCR, etc., with the caller identification information automatically inserted into the video path such as for a predetermined time interval upon receipt of an incoming call, etc. The data, clock and reset signal signals input to video generator 31 are coupled to synchronizer circuits 30, character generator 32 and internal background video generator 34, the outputs of which are coupled to multiplexer 36. Synchronizer circuits 30 are coupled to character generator 32 and multiplexer 36 as illustrated, and serve to control the timing of video generator 31.

Video generator 31 serves to overlay textual or other information over a video signal provided by the external source coupled to input 38A (which is amplified by amplifier 38, the output of which is coupled to an input of multiplexer 36), or video generator 31 can generate an internal background video signal and overlay textual or other information over the internal background video signal. Synchronizer circuits 30 synchronize character generator 32 to the internal or external selected video source. Multiplexer 36 selects, under control of control processor 28 and synchronizer circuits 30, which video source is output to amplifier 40, the output of which is coupled to output 42. Multiplexer 36 thus may select the internal or external video source and also may overlay textual or other information such as for displaying caller identification information on the selected video signal. Multiplexer 36 thus may select a video source and superimpose pixel data over the selected video signal in order to display the desired caller identification information.

Video generator 31 in certain preferred embodiments is implemented with an NEC μPD6454 integrated circuit, the user's manual(s) and related documentation for which are hereby incorporated by reference.

Under control of control processor 28, video generator 31 desirably displays caller identification information over an internally or externally generated video signal in a selected location and with selected textual and background colors or the like, retains the displayed caller identification information for a desired duration (such as may be selected through switch input 29B, etc.) or until another call is received, etc.

The output video signal is coupled through amplifier 40 to output 42, which may coupled to other components of the system (see, FIGS. 1–4 and 6, etc.).

In alternative embodiments, control processor 28 (or line modem 26) provides data and/or control signals to auxiliary display 25 for display of such caller identification information, in conjunction with displayed caller identification information on a television and/or as a standalone display.

Figure 6:
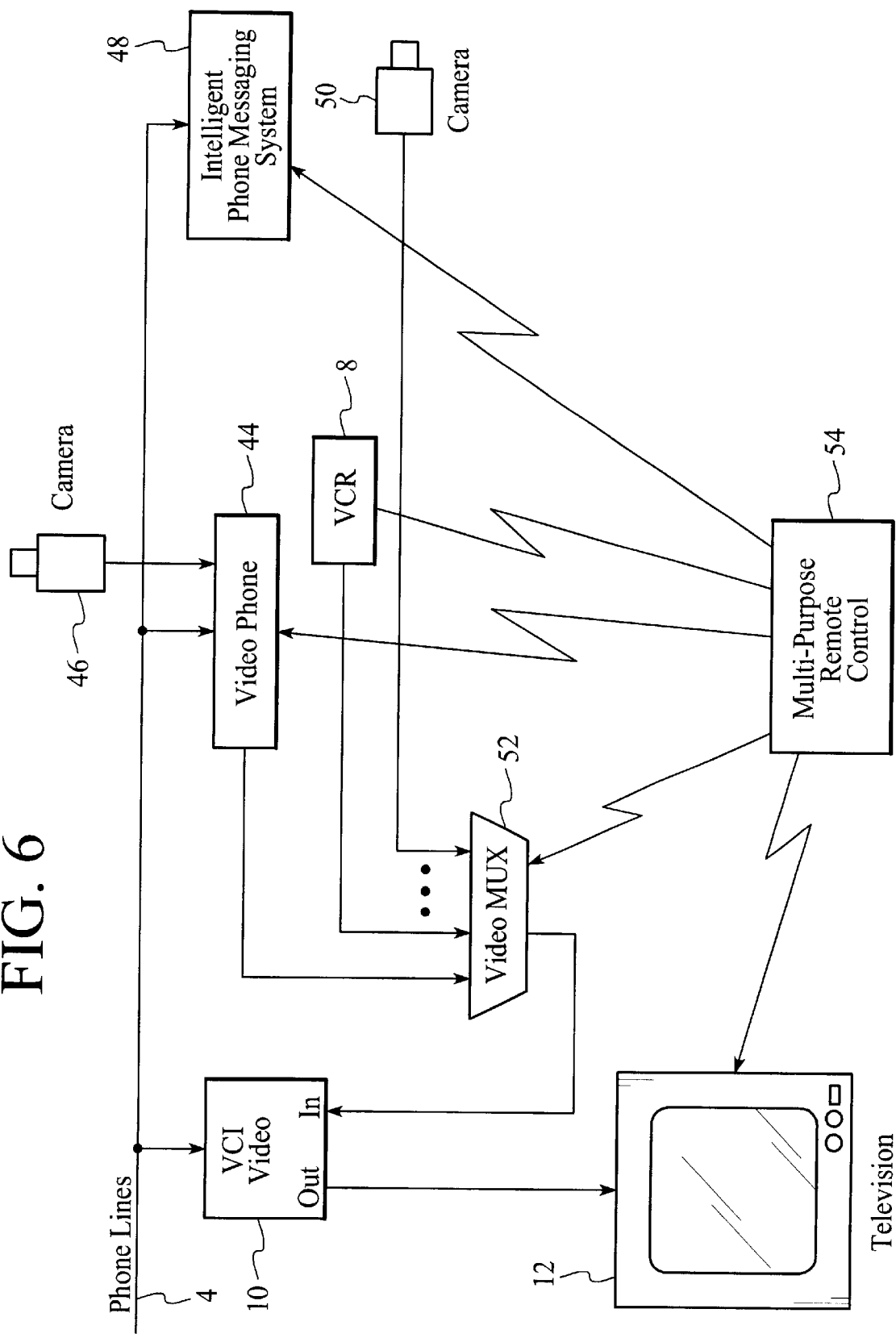
FIG. 6 is a diagram illustrating a fifth embodiment system configuration of the present invention.

FIG. 6 is a diagram illustrating a fifth embodiment system configuration of the present invention, which provides even more advanced functionality in accordance with the present invention. In accordance with this embodiment, telephone line 4 is coupled to video caller ID circuit 10 and also to video phone 44 and voice messaging system 48. Video phone 44 may be coupled to receive as an input a video signal from camera 46, which may serve to provide an input of the television viewer for purposes of a video telephone call. A video output of video phone 44 along with other video inputs such as from VCR 8 (which may include other video sources, as described above) and camera 50 (which may be a security camera or other camera, such as camera 16 of FIG. 2, etc.) are coupled to multiplexer 52. In certain preferred embodiments, an output of multiplexer 52 is coupled to an input of video caller ID circuit 10, an output of which is coupled to a television system (such as television 12 or televisions 12A, 12B, 12C, etc.). Video multiplexer 52, video phone 44 and/or voice messaging system 48 may be controlled either manually or by way of multi-purpose remote control 54 (which may be an infrared or other conventional-type remote control device). In certain preferred embodiments, remote control 54 can be programmed so as to be able to control television 12, VCR 8, video phone 44, voice messaging system 48 and other devices such as a sound system, etc.

With such embodiments, in response to an incoming call, video caller ID circuit 10 displays caller identification information on television 12. In response to viewing the displayed caller identification information, the television viewer could answer the incoming call manually with an external telephone (not shown), or alternatively such as by remote control answer the incoming call through video phone 44, which may be a regular voice only call or a video call. Still alternatively, the television viewer has the ability to direct the incoming call to voice messaging system 48, which plays one of a variety of outgoing messages, which may be selected depending upon the particular caller identification information. For example, a different message may be played to a telephone solicitor than would be played to a friend or family member, etc. The incoming call also may be forwarded to another line by voice messaging system 48, which again may be under control of remote control 54.

For video calls, remote control 54 and/or video phone 44 includes a microphone. Sound for the telephone call may be provided through speaker integral to television 12 or through a speaker integral or coupled to video phone 44. In operation, if receipt of a call through video phone 44 is selected, remote control 54, for example, may automatically mute the audio from television 12 as appropriate to have a more desirable telephone call. Similar to previously described embodiments, whether or not there is an incoming call, an input from a video source such as camera 50 (which may be a door security camera, baby monitor, etc.) may be coupled to television 12 through video caller ID circuit 10, which in the illustrated embodiments may be under control of remote control 54.

As will be appreciated, the disclosed preferred embodiments provide a variety of ways for caller identification information to be desirably displayed on a video screen such as a television, which may be coupled with other video sources and the like and also with advanced telephony functions, such as a video phone, voice messaging system, etc. Embodiments of the present invention may be combined and/or integrated, such as to provide an advanced television/telephony system, with speaker/video phone capability integrated with the television and/or other video source. In one particular integrated embodiment, the television includes video caller identification capability (such as a circuit such as video caller ID circuit ID as well as a speaker phone or video phone capability, and in such embodiments the caller identification information may be automatically inserted into the video signal path (such as in a bar at the top of the screen or a picture-in-picture window, etc.), with the user answering the call by remote control (via speaker phone or video phone, etc.), with the television automatically muted, etc., in response to answering of the call (in such embodiments, the television may include computer hardware also to serve as a personal computer, with remote control keyboard, etc., with the displayed video signal being computer-generated graphics or text or a more typical video signal through a video card coupled to the computer hardware, etc.). Video caller ID circuit 10 also may include memory and processing capability to retain a log of incoming calls (number, name, nickname, etc.) as well as associated data (time, duration, etc.), which may be displayed, retained, output in some form (such as over a computer interface, printed or the like) or deleted as directed by the user (such as by way of remote control, etc.). Additionally, video caller ID circuit 10 may be intelligently programmed to recognize certain callers from the caller identification information and automatically take appropriate action, such as directing the call to a voice messaging system, forwarding the call, etc. Such refinements are within the scope of the present invention.

Although various preferred embodiments of the present invention have been disclosed for illustrative purposes, those skilled in the art will appreciate that various modifications, additions and/or substitutions are possible without departing from the scope and spirit of the present invention as disclosed in the claims.

What is claimed is:

1. A method for displaying caller identification information on an integrated display/telephone system capable of displaying images, the method comprising the steps of:

receiving one or more signals and displaying one or more images on a display of the integrated display/telephone system, wherein the display displays images based on the one or more received signals;

receiving an incoming telephone call with the integrated display/telephone system, wherein data corresponding to the incoming telephone call is received with the incoming telephone call; and generating a caller identification display signal, wherein the caller identification display signal is based on the one or more received signals and the data received with the incoming telephone call, wherein the caller identification display signal comprises the one or more received signals and signals from a generator that generates character signals and background display signals, wherein the character signals are generated responsive to the data received with the incoming call, wherein in response to an incoming telephone call, caller identification information is displayed on the display along with the displayed one or more images.

2. The method of claim 1, wherein the integrated display/telephone system includes a multiplexer that operates responsive to the one or more received signals and the character signals and the background display signals, wherein the multiplexer operates synchronized with the one or more received signals.

3. The method of claim 1, wherein the integrated display/telephone system comprises a telephone system that includes the display for displaying the one or more images based on the one or more received signals.

4. The method of claim 1, wherein the display of caller identification information is selectively operative in response to user input.

5. The method of claim 1, wherein sound from a speaker associated with the integrated display/telephone device is muted in response to user input to answer the incoming telephone call.

6. The method of claim 1, wherein a voice messaging system is integrated with the integrated display/telephone system.

7. The method of claim 1, wherein the caller identification information is displayed on the display for a predetermined interval of time and then the display of the caller identification information is automatically terminated.

8. The method of claim 7, wherein the predetermined interval of time is selectable by a user.

9. The method of claim 1, wherein the integrated display/telephone system is programmable to recognize one or more particular callers based on the caller ID data.

10. The method of claim 9, wherein the integrated display/telephone system automatically initiates action to respond to the received telephone call based on the recognition of the one or more particular callers.

11. The method of claim 10, wherein the automatically initiated action includes displaying a name or nickname based on the recognition of the one or more particular callers.

12. The method of claim 1, wherein a speaker is provided with the integrated display/telephone system, wherein a telephone call is initiated in response to a user input.

13. The method of claim 1, wherein the integrated display/telephone system is adapted to be coupled to a personal computer and for communication of commands between the integrated display/telephone system and the personal computer.

14. The method of claim 1, wherein the displayed caller identification information comprises computer-generated graphics or text.

15. The method of claim 1, wherein the integrated display/telephone system includes a memory coupled to a processor, wherein the integrate display/telephone system retains a log of incoming received telephone calls.

16. The method of claim 15, wherein the log includes information selected from the group consisting of telephone number of the caller, name of the caller, nickname of the caller, time of receipt of a call, and duration of a call.

17. The method of claim 15, wherein information in the log may be deleted by a user in response to an input from a remote control.

18. The method of claim 15, wherein information in the log is output over a computer interface or printed.

19. The method of claim 1, wherein a control processor provides control signals for controlling the generator.

20. The method of claim 19, wherein the control processor also provides control signals for an amplifier for providing output signals coupled to the display.

* * * * *